(12) United States Patent
Mazmanov et al.

(10) Patent No.: US 10,394,464 B2
(45) Date of Patent: Aug. 27, 2019

(54) VOLATILE MEMORY ACCESS MODE IN AN ELECTRONIC TERMINAL FOR PROTECTING APPLICATION FILES FROM FILE OPERATIONS

(71) Applicant: Telefonaktiebolaget LM Ericsson (publ), Stockholm (SE)

(72) Inventors: Dimitri Mazmanov, Stockholm (SE); Hongxin Liang, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 429 days.

(21) Appl. No.: 15/038,284

(22) PCT Filed: Nov. 27, 2013

(86) PCT No.: PCT/SE2013/051394
§ 371 (c)(1),
(2) Date: May 20, 2016

(87) PCT Pub. No.: WO2015/080635
PCT Pub. Date: Jun. 4, 2015

(65) Prior Publication Data
US 2016/0299716 A1    Oct. 13, 2016

(51) Int. Cl.
*G06F 12/00* (2006.01)
*G06F 3/06* (2006.01)
*G06F 21/53* (2013.01)

(52) U.S. Cl.
CPC ............ *G06F 3/0619* (2013.01); *G06F 3/065* (2013.01); *G06F 3/067* (2013.01); *G06F 3/0644* (2013.01);
(Continued)

(58) Field of Classification Search
CPC ...... G06F 3/0619; G06F 3/0644; G06F 3/065; G06F 3/067; G06F 21/53; G06F 2221/2105; G06F 2221/2149
See application file for complete search history.

(56) References Cited

U.S. PATENT DOCUMENTS

| | | |
|---|---|---|
| 2009/0055683 A1 | 2/2009 | Wells et al. |
| 2009/0222878 A1 | 9/2009 | Walsh et al. |
| 2010/0175104 A1 | 7/2010 | Khalid |

OTHER PUBLICATIONS

International Search Report for International application No. PCT/SE2013/051394 dated Jun. 20, 2014.
(Continued)

*Primary Examiner* — Matthew Bradley
(74) *Attorney, Agent, or Firm* — Patent Portfolio Builders, PLLC

(57) ABSTRACT

An electronic terminal (100) switches (500) from a normal memory access mode to a volatile memory access mode responsive to receiving user input. An open-write command is received (510) from an application to open a first file for writing. A determination (512) is made whether the first file is located in a volatile memory partition of the at least one memory. Based on determining the first file is not located in the volatile memory partition of the at least one memory, the first file is copied (516) from a normal memory partition of the at least one memory to the volatile memory partition, and the first file located in the volatile memory partition is opened (518) for writing. In contrast, based on determining the first file is located in the volatile memory partition, the first file located in the volatile memory partition is opened (520) for writing. Write commands from the application are directed (524) to the first file located in the volatile memory partition.

18 Claims, 6 Drawing Sheets

(52) U.S. Cl.
CPC ...... *G06F 21/53* (2013.01); *G06F 2221/2105* (2013.01); *G06F 2221/2149* (2013.01)

(56) References Cited

OTHER PUBLICATIONS

Anonymous: "Xperia Tablet S—The Benefits of Guest Mode", retrieved from the Internet: URL:http://www.3g.co.uk/PR/Sept2012/xperia-tablet-s-the-benefits-of-guest-mode.html—Sep. 18, 2012.
Anonymous: "Microsoft Surface RT is the Perfect Family Tablet, Thanks to the True Multiple User Accounts Support in Windows RT | Redmond Pie", retrieved from the Internet: URL:http://www.redmondpie.com/microsoft-surface-rt-is-the-perfect-family-tablet-thanks-to-the-true-multiple-user-accounts-support-in-windows-rt/—Oct. 25, 2012.
Paul Thurrott: "Windows 7 Feature Focus: Guest Mode History of Guest Mode", retrieved from the Internet: URL:http://winsupersite.com/windows-7/windows-7-feature-focus-guest-mode—Oct. 6, 2010.

VOLATILE MEMORY ACCESS MODE IN AN ELECTRONIC TERMINAL FOR PROTECTING APPLICATION FILES FROM FILE OPERATIONS

PRIORITY

This nonprovisional application is a U.S. National Stage Filing under 35 U.S.C. § 371 of International Patent Application Serial No. PCT/SE2013/051394, filed Nov. 27, 2013, and entitled "Volatile Memory Access Mode In An Electronic Terminal For Protecting Application Files From File Operations".

TECHNICAL FIELD

The present disclosure relates to electronic terminals and, more particularly, to controlling file operations by applications on user equipment nodes.

BACKGROUND

Increasingly, users install a wide range of applications (also commonly referred to as "apps") on a wide range of electronic terminals. For example, users install applications on cellular telephones (sometimes called "smart phones"), tablet computers, etc., for literally thousands of purposes. Many situations arise in which one person will share their electronic terminal with another person.

For example, parents will allow their children to play games and use other applications on the parents' electronic terminal. This can result in unwanted pictures being stored in memory of the electronic terminal and inclusion of such pictures in electronic picture organizer/editor applications, undesired changes to application configuration settings, deletion of applications from the memory, downloading of unwanted content to the memory through applications, addition/deletion of web browser bookmarks, etc. Moreover, some changes may not be immediately apparent to the parents, such as when calendared entries are changed/deleted, account information is deleted, or other subtle changes are made to information that is managed by applications. Such changes can motivate parents to avoid allowing such access to their children and others and/or can create anxiety and wasted time for the parents who attempt to identify and undo changes.

Some manufacturers of electronic terminal devices and/or operating systems allow persons to back-up their applications to the cloud (e.g., networked computer systems), such as provided by iCloud from Apple for iOS operating system devices and Google Sync from Google for Android operating system devices. A person can thereby back-up all applications and data to a cloud computer system for a particular time snapshot when the electronic terminal is networked to the cloud computer system, and when desired can restore the electronic terminal to the particular state of applications and data that was previously captured at the particular time snapshot.

Because of the requirement for the electronic terminal to be networked to the cloud computer system during the entire back-up process and restoration process and the relative large amounts of data that is transferred therebetween through the networks, the limited availability of these processes and lengthy time for the processes to be completed results in only occasional use thereof. Consequently, it may be undesirable and perhaps not feasible for a person to restore an electronic terminal to a previous back-up in order to undo changes that occurred from allowing another person to use that electronic terminal.

For these and other reasons, the present processes for protecting and controlling applications and associated data on electronic terminal continues to be unreasonably burdensome to some people and can fail to sufficiently safeguard their interests.

SUMMARY

It may therefore be an object to address at least some of the above mentioned disadvantages and/or to provide improved control over the operation of applications on electronic terminals.

One embodiment is directed to an electronic terminal that includes at least one processor and at least one memory. The at least one memory is coupled to the at least one processor and includes computer readable program code that when executed by the at least one processor causes the at least one processor to perform operations described below. Switching is performed from a normal memory access mode to a volatile memory access mode responsive to receiving user input. An open-write command is received from an application to open a first file for writing. A determination is made whether the first file is located in a volatile memory partition of the at least one memory. Based on determining the first file is not located in the volatile memory partition of the at least one memory, the first file is copied from a normal memory partition of the at least one memory to the volatile memory partition, and the first file located in the volatile memory partition is opened for writing. In contrast, based on determining the first file is located in the volatile memory partition, the first file located in the volatile memory partition is opened for writing. Write commands from the application are directed to the first file located in the volatile memory partition.

Potential advantages of this approach are that a person can switch an electronic terminal to the volatile memory access mode, such as by pushing a soft/hardware switch or entering a defined keystroke sequence, and hand over control of the electronic terminal to another person without worrying about what changes to applications, settings, and data may occur because such changes can be automatically removed when the person switches the electronic terminal back to the normal memory access mode.

In this and further embodiments, while in the normal memory access mode, files located in the normal memory petition can be accessed using conventional file access operations to respond to commands from applications to open files for writing data from the applications, to open files for reading data by the applications, and/or to delete files identified by the applications. In sharp contrast, while in the volatile memory access mode, files are copied from the normal memory partition to a volatile memory partition of the memory responsive to applications commanding the files to be opened for writing, and files in the normal memory partition are marked as being deleted (but are not deleted from the normal memory partition) responsive to applications commanding the files to be deleted.

Thus, applications do not change application content of files located in the normal memory partition while the electronic terminal is operating in the volatile memory access mode. The electronic terminal can thereby be switched from the normal memory access mode to the volatile memory access mode to prevent applications from modifying files within the normal memory partition, and can be returned back to the normal memory access mode with automated operations as described according to embodiments herein.

In a further particular embodiment, responsive to the switching from the normal memory access mode to the volatile memory access mode, the operations further include, prior to the receiving of the open-write command from the application, notifying at least one application that is running to save its operational state to a file. The at least one application is closed. The at least one application that was closed may be subsequently restarted. The one of the at least one application is the application from which the open-write command is received and the first file is the file in which the application saved its operational state responsive to the notifying.

In another further particular embodiment, an open-read command is received from the application to open a second file for reading. A determination is made whether the second file is located in the volatile memory partition of the at least one memory. Based on determining the second file is not located in the volatile memory partition of the at least one memory, the second file located in the normal memory partition is opened for reading, and read commands from the application are directed to the second file located in the normal memory partition. In contrast, based on determining the second file is located in the volatile memory partition, the second file located in the volatile memory partition is opened for reading, and read commands from the application are directed to the second file located in the volatile memory partition.

In another further particular embodiment, a delete command is received from the application to delete a third file. A determination is made whether the third file is located in the volatile memory partition of the at least one memory. Based on determining the third file is not located in the volatile memory partition of the at least one memory, the third file located in the normal memory partition is renamed to another name to prevent read and write access by the application. In contrast, based on determining the third file is located in the volatile memory partition, the third file located in the volatile memory partition is deleted, and the third file located in the normal memory partition was renamed to another name to prevent read and write access by the application, based on determining the third file is located in the normal memory partition of the at least one memory.

Other methods and apparatuses according to embodiments of the invention will be or become apparent to one with skill in the art upon review of the following drawings and detailed description. It is intended that all such additional methods and apparatuses be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein.

Embodiments of the present disclosure are directed to electronic terminals that selectively switch between a normal memory access mode and a volatile memory access mode responsive to user input. While in the normal memory access mode, files located in one partition of memory (referred to herein as a "normal memory petition") can be accessed using conventional file access operations to respond to commands from applications to open files for writing data from the applications, to open files for reading data by the applications, and/or to delete files identified by the applications. In sharp contrast, while in the volatile memory access mode, files are copied from the normal memory partition to a volatile memory partition of the memory responsive to applications commanding the files to be opened for writing, and files in the normal memory partition are marked as being deleted (but are not deleted from the normal memory partition) responsive to applications commanding the files to be deleted. Thus, applications do not change application content of files located in the normal memory partition 130 while the electronic terminal is operating in the volatile memory access mode. The electronic terminal can thereby be switched from the normal memory access mode to the volatile memory access mode to prevent applications from modifying files within the normal memory partition, and can be returned back to the normal memory access mode with automated operations as described according to embodiments herein. These and other embodiments are explained below with reference to the non-limiting examples of FIGS. 1-9.

Figure 1:
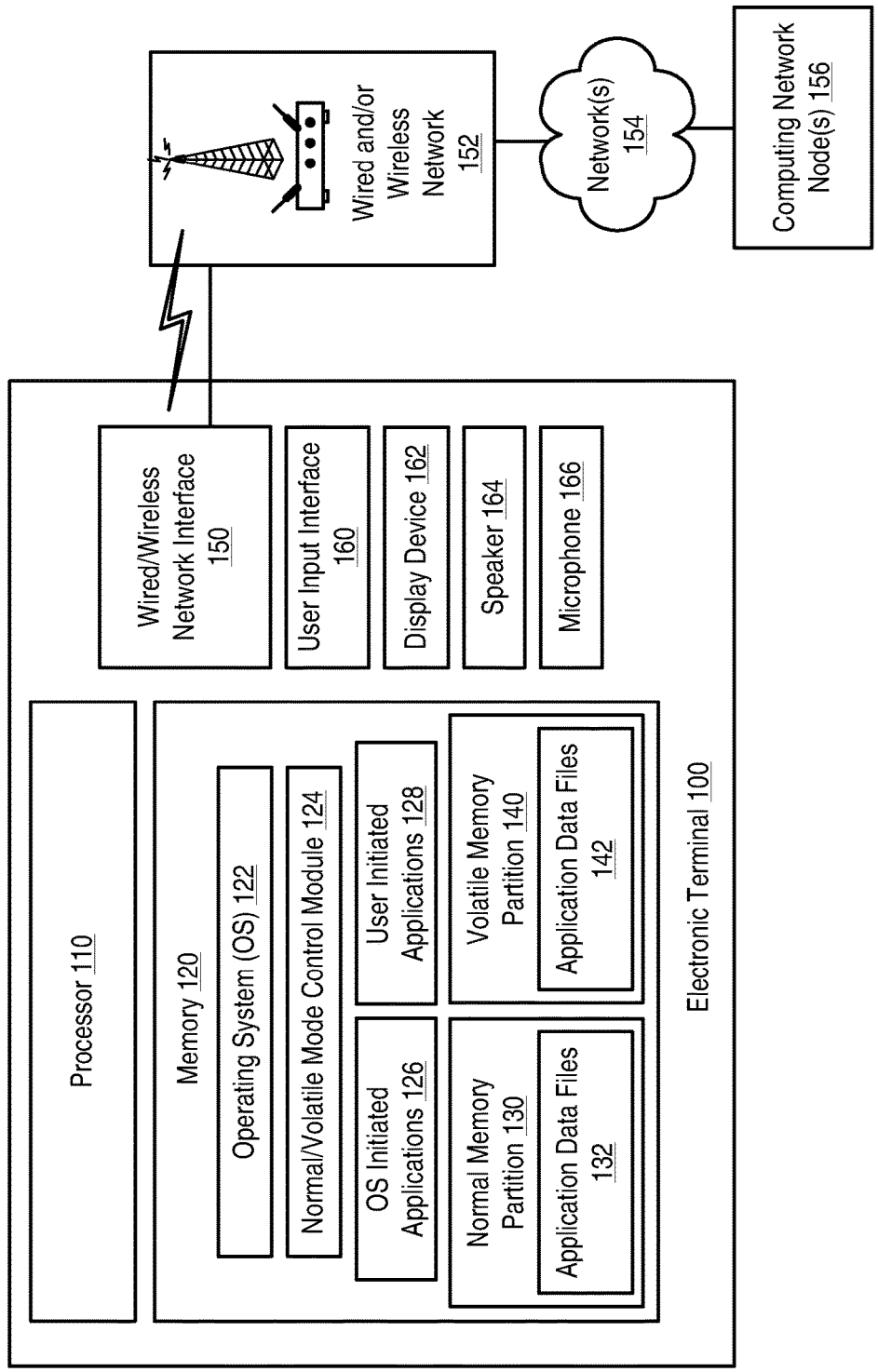
FIG. 1 is a block diagram of an electronic terminal within a computer system that is configured to operate according to some embodiments.

FIG. 1 is a block diagram of an electronic terminal 100 within a computer system that is configured to operate according to some embodiments. The electronic terminal 100 can communicate through one or more wired and/or wireless communication access networks 152 and backbone networks 154 to one or more computing network nodes 156 that store applications and/or data that are downloadable to the electronic terminal 100 for execution/use.

The electronic terminal 100 can be any type of device that can receive applications from a network node via a data network, and can execute the application to perform operational functionality for a person using the electronic terminal 100 and/or for other applications executable by the electronic terminal 100. Examples of an electronic terminal 100 can include, but are not limited to, fixed/mobile/transportable terminals (e.g., smart phones and tablet computers), televisions, gaming consoles, appliances having computer processing capability, and desktop computers.

The example electronic terminal 100 can include at least one processor 110, at least one memory 120, and at least one network interface 150. The network interface 150 may include a cellular transceiver, a wired network interface, a wireless local area network transceiver, a Bluetooth transceiver, a near field communication transceiver, and/or another wireless communication circuit. Accordingly although only one representative processor 110, memory 120, and network interface 150 is illustrated in FIG. 1 for ease of illustration and explanation, is be understood that a plural number of processors, memories, and/or network interfaces may be used. The electronic terminal 100 may further include a user input interface 160, display device 162, a speaker 164, and/or a microphone 166.

The processor 110 may include one or more data processing circuits, such as a general purpose and/or special purpose processor (e.g., microprocessor and/or digital signal processor). The processor 110 is configured to execute computer program instructions from the memory 120, described below as a computer readable medium, to perform some or all of the operations and methods that are described herein for one or more of the embodiments disclosed herein. The memory 120 can include an operating system (OS) 122 (e.g., iOS by Apple, Android OS by Google, etc.), a normal/volatile mode control module 124, applications 126 that are initiated by operation of the operating system without requiring intervening input from a user (referred to herein as "OS initiated applications"), and applications 128 that are initiated responsive to receiving input from a user such as via a user selection of an application indicia (referred to herein as "user initiated applications"). The OS initiated applications 126 may include, for example, applications for receiving communication messages that are incoming to the electronic terminal 100, applications for receiving incoming phone calls to the electronic terminal 100, applications for generating reminders of scheduled events, etc.

The applications 126/128 may be downloaded from the computing network node 156, which may be an application store such as the iTunes application store or the Android Marketplace application store. The applications 126/128 can read and/or write data to application data files in the memory 120, such as the illustrated application data file 132, where the data may include, but is not limited to, contact information (e.g. phonebook), user defined application settings, user data entered into an application and/or generated by the application for a user, etc.

The normal/volatile mode control module 124 when executed via the processor 110 causes the processor 110 to switch the electronic terminal 100 between operating in the normal memory access mode and the volatile memory access mode responsive to receiving input from a user, such as through the user input interface 160 (e.g., a touch screen interface, a keypad, keyboard, switch, etc.), or other defined event. While operating in the normal memory access mode, the control module 124 causes commands from one of the applications 126/128 to open an application data file 132 for writing data to cause that file 132 to be opened within the normal memory partition 130, to open a file for reading data to cause that file 132 to be opened within the normal memory partition 130, and/or to delete a file to cause that file 132 to be deleted from the normal memory partition 130.

Figure 2:
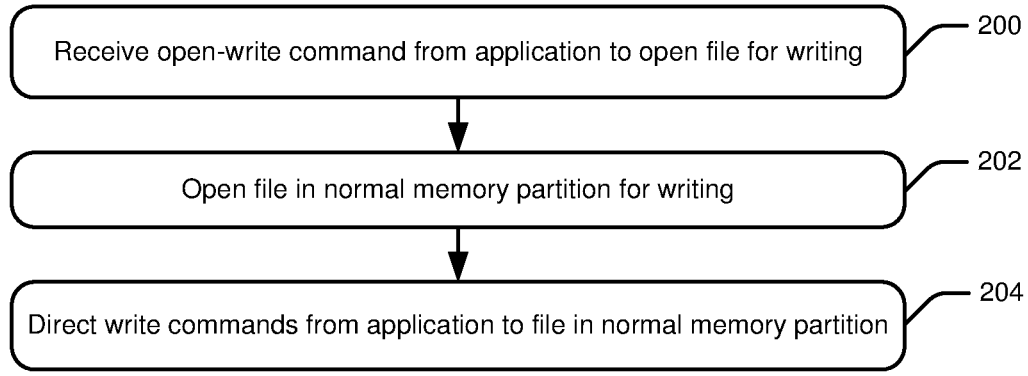
FIGS. 2-3 are flowcharts of operations and methods performed by the electronic terminal of FIG. 1 to open files for reading or writing and for deleting files while operating in a normal memory access mode, according to some embodiments.

Example operations and methods for opening a file for writing during the normal memory access mode are illustrated by the flowchart in FIG. 2. The control module 124 receives (block 200) an open-write command from an application 126/128 to open a file for writing. The control module 124 opens (block 202) the file 132 located in the normal memory partition 130 for writing. The control module 124 then directs write commands from the application 126/128 to the file 132 located in the normal memory partition 130, so that data from the application 126/128 is written to the file 132.

Figure 3:
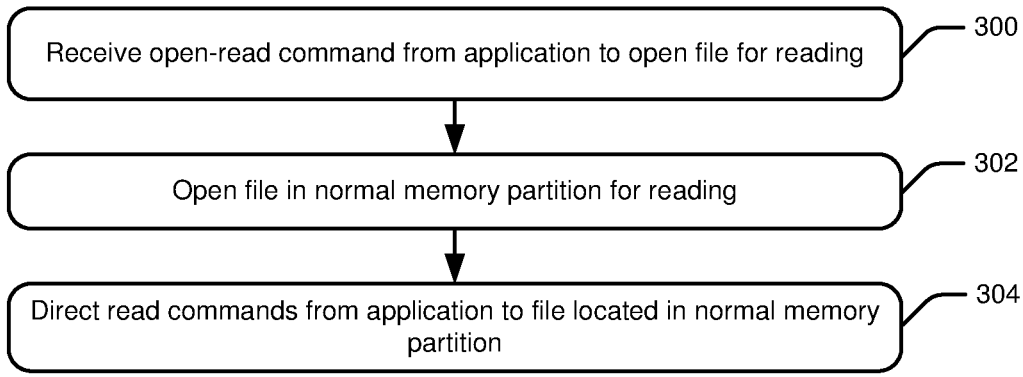

Example operations and methods for opening a file for reading during the normal memory access mode are illustrated by the flowchart in FIG. 3. The control module 124 receives (block 300) an open-read command from an application 126/128 to open a file for reading. The control module 124 opens (block 302) the file 132 located in the normal memory partition 130 for reading. The control module 124 then directs read commands from the application 126/128 to the file 132 located in the normal memory partition 130, so that the application 126/128 reads data from the file 132.

Figure 4:
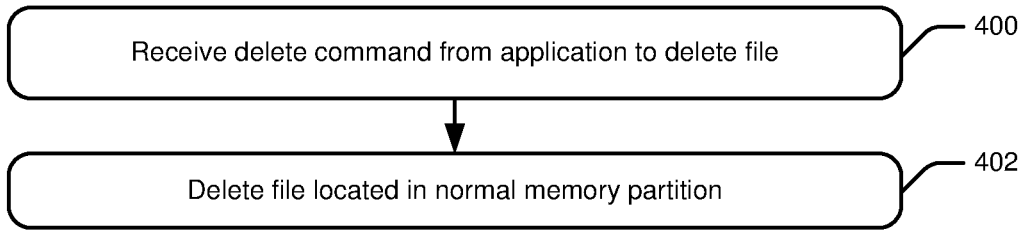
FIGS. 4-10 are flowcharts of operations and methods performed by the electronic terminal of FIG. 1 to open files for reading or writing and for deleting files while operating in a volatile memory access mode, according to some embodiments.

Example operations and methods for deleting a file during the normal memory access mode are illustrated by the flowchart in FIG. 4. The control module 124 receives (block 400) a delete command from an application 126/128 to delete a file. The control module 124 responds by deleting (block 42) the file 132 located in the normal memory partition 130.

The control module 124 can switch the electronic terminal 100 from operating in the normal memory access mode to instead operating in the volatile memory access mode in response to, for example, receiving input from a user, such as when a user toggles a switch, enters a defined key sequence, selects a displayed indicia, etc via the user input interface 160. In sharp contrast to operation in the normal memory access mode, while operating in the volatile memory access mode a file 132 located in the normal memory petition 130 is copied from the normal memory partition 130 to create a file 142 located in a volatile memory partition 140 of the memory 120 responsive to an application 126/128 commanding the file 132 to be opened for writing, and a file 132 located in the normal memory partition 130 is renamed to another name to indicate that it has being then deleted (but is not actually deleted from the normal memory partition 130) responsive to an application 126/128 commanding the file 132 to be deleted. Thus, the application 126/128 does not change application content of the file 132 located in the normal memory partition 130 while the electronic terminal 100 is operating in the volatile memory access mode. The electronic terminal 100 can thereby be switched from the normal memory access mode to the volatile memory access mode to prevent applications 126/128 from modifying files 132 within the normal memory partition 130, and can be returned back to the normal memory access mode with automated operations as described according to embodiments herein.

Figure 5:
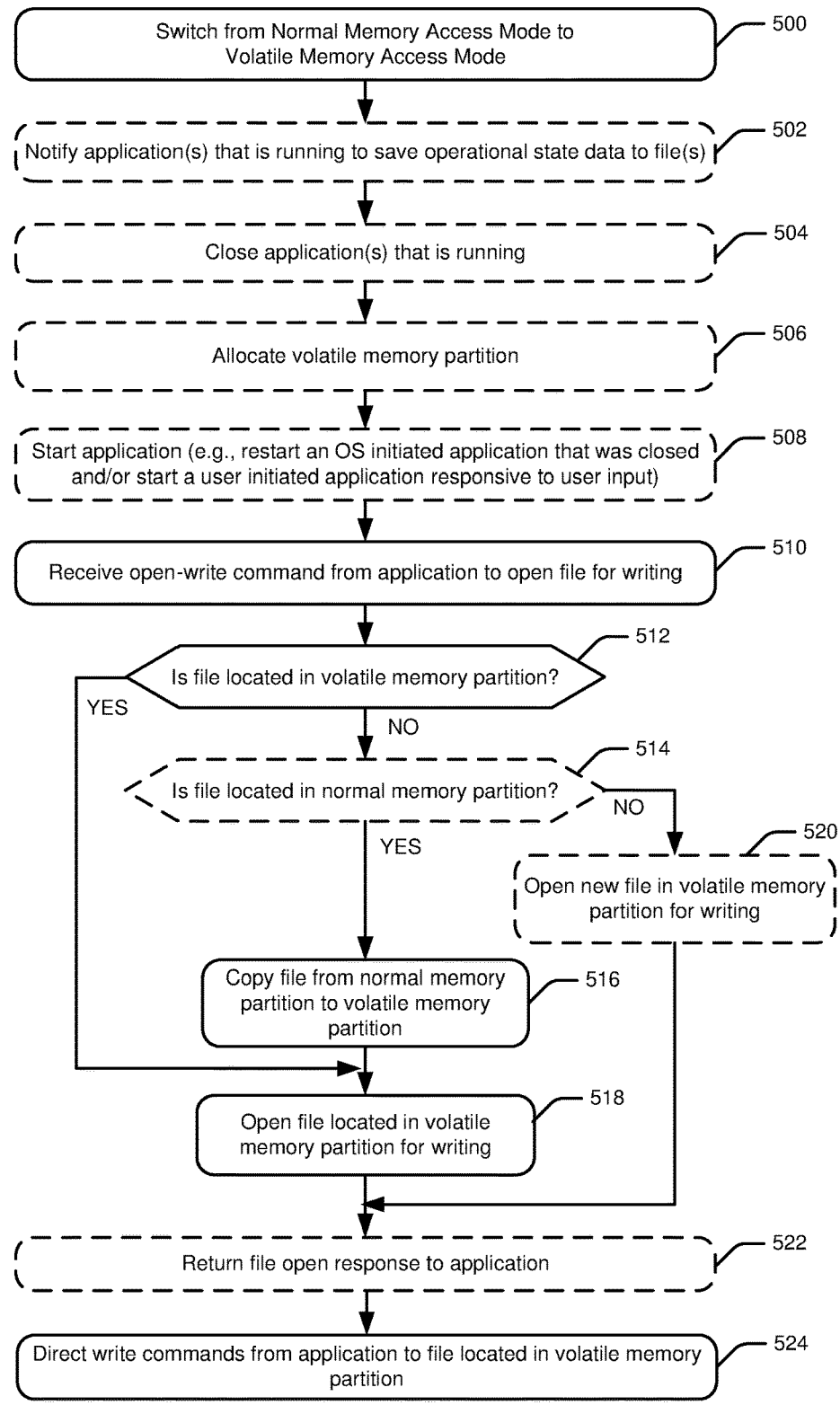

Example operations and methods for opening a file for writing during the volatile memory access mode are illustrated by the flowchart in FIG. 5. The control module 124 switches (block 500) from the normal memory access mode to the volatile memory access mode. The control module 124 may optionally, but not necessarily, notify (block 502) at least one application 126/128 that is presently running to save its operational state data to corresponding at least one application data file 132 located in the normal memory partition 130, so that, for example, the at least one application 126/128 may then be closed (block 504) and later started with that same operational state using the saved operational state data which is retrieved from the file(s) 132. The control module 124 may then optionally, but not necessarily, start (block 508) the at least one application if closed (block 504), such as when the application is an OS initiated application 126.

The control module 124 may optionally, but not necessarily, respond to the switching (block 500) from the normal memory access mode to the volatile memory access mode or responsive to the closing (block 504) the application(s), by allocating (block 506) the volatile memory partition in the memory 120. Alternatively the volatile memory partition may have already by allocated within the memory 120 or may be allocated per-file when opened.

The control module 124 receives (block 510) an open-write command from an application 126/128 to open a file (referred to as the "first file" for ease of reference without limitation describing FIG. 5) for writing. Control module 124 determines (block 512) whether the first file is located in the volatile memory partition 140 as file 132. Based on determining (block 512) the first file 132 is not located in the volatile memory partition 140, the control module 124 copies (block 516) the first file 132 from the normal memory partition 130 to the volatile memory partition 140 to create file 142, and opens (block 518) the first file 142 located in the volatile memory partition 140 for writing. In contrast, based on determining (block 512) the first file 142 is located in the volatile memory partition 140, the control module 124 opens (block 518) the first file 142 for writing. The control module 124 then directs (block 524) write commands from the application 126/128 to the first file 142 located in the volatile memory partition 140 for writing data from the application 126/128 to the first file 142.

The control module 124 may optionally generate (block 524) a notification to a user of the electronic terminal 100 in response to a remaining file storage capacity of the volatile memory partition 140 which has been allocated (506) falls below a threshold level as data is written to files located in the volatile memory partition 140. The control module 124 may allocate (block 506) further data storage space of the memory 120 responsive to receiving user input, such as via the interface 160 and/or based on one or more defined rules.

The application 126/128 referred to when describing FIG. 5 may be the same application from which the open-write command is received (block 510) and the first file 132 may be the file in which the application 126/128 saved its operational state responsive to the notifying (block 502).

With continuing reference to FIG. 5, the control module 124 may optionally, but not necessarily, based on determining (block 512) the first file 142 is not located in the volatile memory partition 140, perform further operations to determine (block 514) whether the first file 132 is located in the normal memory partition 130. Based on determining (block 514) the first file 132 is not located in the normal memory partition 130, the control module 124 can open (block 520) a new file as the first file 142 in the volatile memory partition 140 for writing. In contrast, based on determining (block 514) the first file 132 is located in the normal memory partition 130, the control module 124 can perform the copying (516) of the first file 132 from the normal memory partition 130 to the volatile memory partition 140 to create the first file 142 and the opening (block 518) of the first file 142 located in the volatile memory partition 140 for writing.

The control module 124 may operate to return (block 522) a file open response to the application 126/128 based on completion of the first file 142 being opened in the volatile memory partition 140 for writing, to indicate that write commands from the application 126/128 are permitted.

Figure 6:
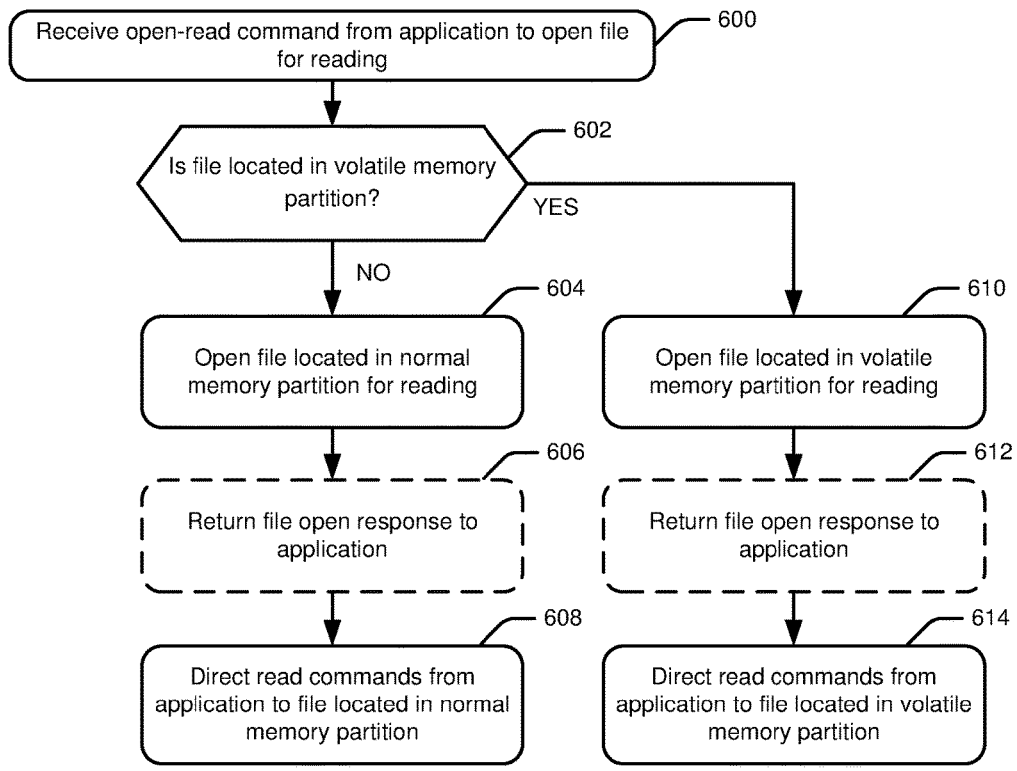

FIG. 6 illustrates a flowchart of operations and methods performed by the electronic terminal 100 of FIG. 1 (e.g., by the control module 124) to open files for reading while operating in the volatile memory access mode, according to some embodiments. The control module 124 receives (block 600) an open-read command from the application 126/128 to open a file (referred to as the "second file" for ease of reference without limitation describing FIG. 6) for reading. The "second file" may be the same as the "first file" or may be another file within memory 120. The control module 124 determines (block 602) whether the second file is located in the volatile memory partition 140, as file 142. Based on determining (block 602) the second file is not located in the volatile memory partition 140, the control module 124 opens (block 604) the second file 132 located in the normal memory partition 130 for reading, and directs (block 608) read commands from the application to the second file 132 located in the normal memory partition 130 to read data therefrom. In contrast, based on determining (block 602) the second file 142 is located in the volatile memory partition 140, the control module 124 opens (block 610) the second file and 42 located in the volatile memory partition 140 for reading, and directs (block 614) read commands from the application 126/128 to the second file 142 located in the volatile memory partition 140 to read data therefrom for providing to the application 126/128.

Based on completing the opening (block 604) the second file and 32 located in the normal memory partition 130 for reading or the opening (block 610) the second file 142 located in the volatile memory partition 140 for reading, the control module 124 may optionally, but not necessarily, return (block 606 or block 612) a file open response to the application 126/128.

Figure 7:
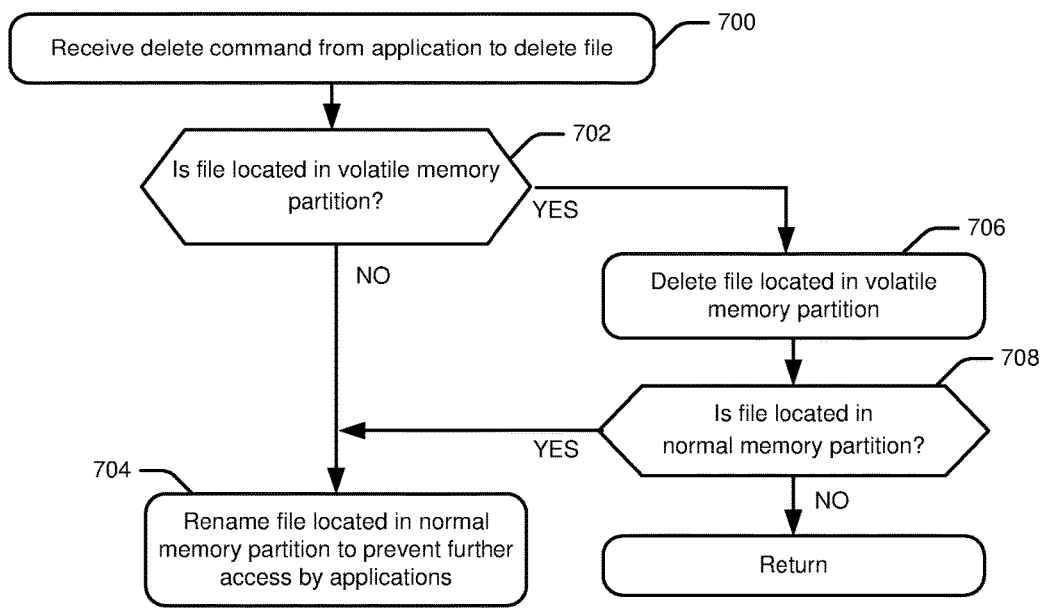
Figure 8:
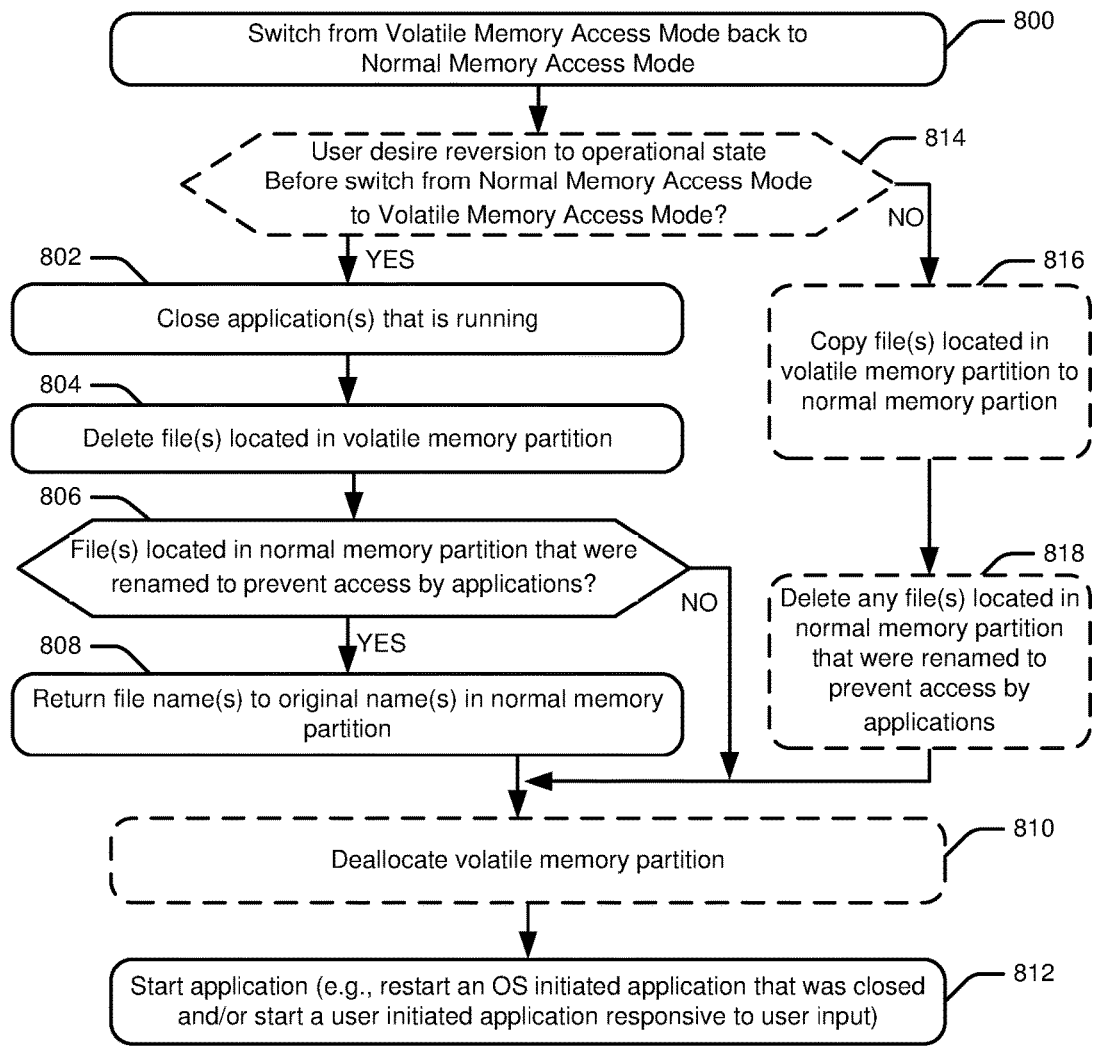

FIG. 7 illustrates a flowchart of operations and methods performed by the electronic terminal 100 of FIG. 1 (e.g., by the control module 124) to delete files while operating in the volatile memory access mode, according to some embodiments. The control module 124 receives (block 700) a delete command from the application 126/128 to delete a file (referred to as the "third file" for ease of reference without limitation describing FIG. 7). The "third file" may be the same as the "first file" and/or the "second file" or may be another file within memory 120.

The control module 124 determines (block 702) whether the third file is located in the volatile memory partition 140, e.g., as file 142. Based on determining (block 702) the third file is not located in the volatile memory partition 140, the control module 124 renames (block 704) the third file 132 located in the normal memory partition 130 to prevent read and write access by the application 126/128. In contrast, based on determining (block 702) the third file 142 is located in the volatile memory partition 140, the control module 124 deletes (block 706) the third file 142 located in the volatile memory partition 140, and renames (block 704) the third file 132 located in the normal memory partition 130 to prevent read and write access by the application 126/128, based on determining (708) the third file 132 is located in the normal memory partition 130.

Figure 9:
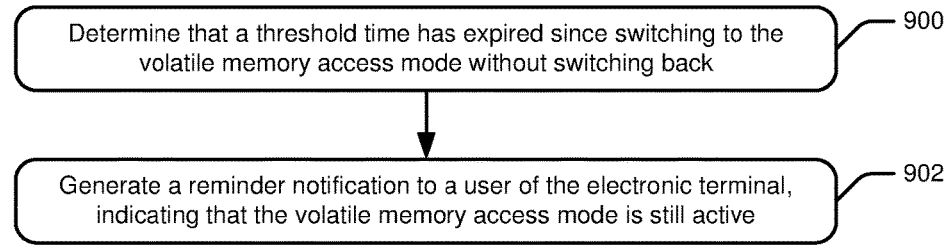

FIG. 9 illustrates a flowchart of operations and methods performed by the electronic terminal 100 of FIG. 1 (e.g., by the control module 124) to switch the volatile memory access mode back to the normal memory access mode, according to some embodiments. The control module 124 switches (block 800) from the volatile memory access mode back to the normal access mode responsive to receiving user input. Control module 124 closes (block 802) the application 126/128 that is running, deletes (block 804) the first file 142, and may delete any other files, located in the volatile memory partition 140. The control module 124 also determines (block 806) whether a file in the normal memory partition 130 was renamed to prevent access by the application and, if so, returns (block 808) the name of the file back to an original name. The control module 124 can then start (block 812) the OS initiated applications 126 (e.g., incoming messaging/phone application, event reminder application, etc.), which are started by the OS without requiring intervention by a user (e.g., without requiring a user to provide an input via the interface 160 to cause startup of a user selected one of the applications). The control module 124 subsequently receives (block 200 of FIG. 2) an open-write command from the application 126 to open a file for writing, opens (block 202 of FIG. 2) the file in the normal memory partition 130 for writing, and directs (block 204) write commands from the application 126 to the file located in the volatile memory partition 130 to write data from the application 126 to the file.

The operations may optionally, but not necessarily include, responsive to the switching (block 800) from the volatile memory access mode back to the normal access mode or responsive to the closing (block 802) the application and 26/128 that is running, the control module 124 can deallocate (block 810) the volatile memory partition 140 to allow at least partial inclusion of the freed memory space within the normal memory partition 130 for use by the applications 126/128.

The control module 124 may determine (900) that a threshold time has expired since the switch (block 500 of FIG. 5) from the normal memory access mode to the volatile memory access mode without receiving a user input to switch (block 800 of FIG. 8) from the volatile memory access mode back to the normal access mode, and responsive thereto generate (block 902 of FIG. 9) a reminder notification to a user of the electronic terminal 100. The reminder notification informs the user that the volatile memory access mode is still active, so that the user can consider switching operations back to the normal memory access mode.

The operations may optionally, but not necessarily include, responsive to the switching (block 800) from the volatile memory access mode back to the normal access mode, the control module 124 determining (block 814) whether the user desires reversion to an operational state before the switching (block 500 of FIG. 5) from the normal access memory mode to the volatile memory access mode. Based on the determination (block 814) that the user desires the reversion, the control module 124 can perform performing the closing (block 802), the deleting (block 804), and the determining (block 806) whether a file in the normal memory partition 130 was renamed to prevent access by the application 126/128.

In contrast, based on the determining (block 814) that the user does not desire the reversion, the control module 124 can perform further operations that include copying (block 816) the file 142 located in the volatile memory partition 140 to the normal memory partition 132. Furthermore, based on determining (block 818) that a file is located in the normal memory partition 130 that was renamed to prevent access by the application, the control module 124 can delete that file from the normal memory partition 130.

Figure 10:
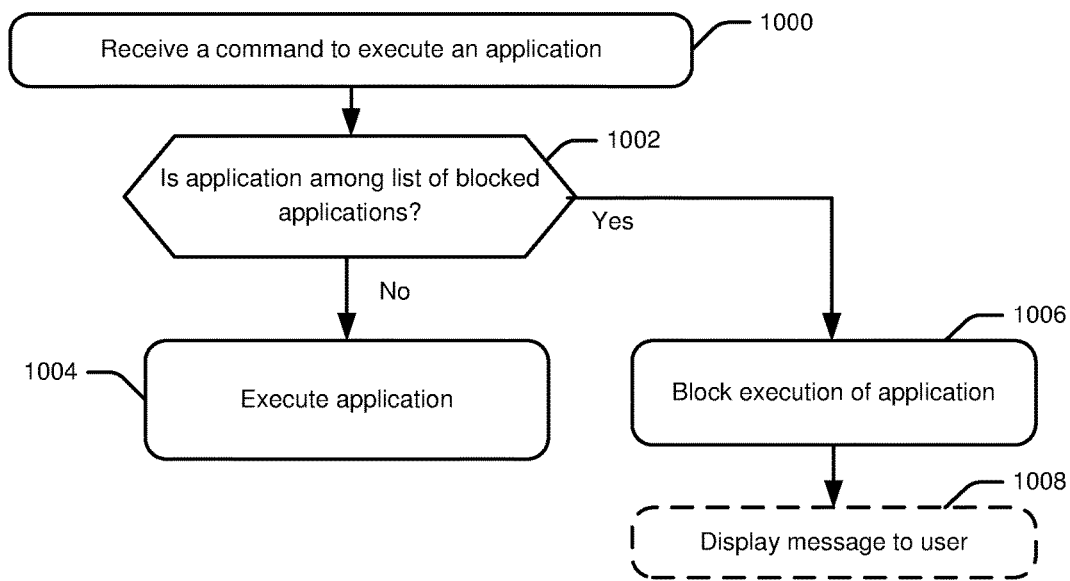

Another embodiment is directed to allowing a user to selectively block execution of identified applications while the electronic terminal 100 is operating in the volatile memory access mode. These operation may, for example, be beneficial for preventing another user who is being allowed to use the terminal 100 from executing applications that access or can change information stored outside the terminal 100, such as with Facebook, Tweeter, or other cloud based application interfaces. FIG. 10 illustrates a flowchart of operations and methods performed by the electronic terminal 100 of FIG. 1 (e.g., by the control module 124) after switching from the normal memory access mode to the volatile memory access mode according to some embodiments. The control module 124 receives (block 1000) a command from a user to execute an application, and determines (block 1002) whether the application is among a list of blocked applications (e.g., a list of applications that have been identified by an owner of the terminal 100 as being blocked from executing during the volatile memory access mode). When blocked, the control module 124 prevents (block 1006) execution of the application and may further display a message to the user indicating that the application cannot be executed. In contrast, when the application is not blocked, the control module 124 allows execution (block 1004) of the application.

FURTHER DEFINITIONS AND EMBODIMENTS

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" or "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the non-transitory computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. An electronic terminal comprising:
   at least one processor; and
   at least one memory coupled to the at least one processor the at least one memory comprising computer readable program code that, when executed by the at least one processor causes the at least one processor to perform operations, the operations comprising:
      switching from a normal memory access mode to a volatile memory access mode responsive to receiving a user input;
      receiving an open-write command from an application to open a first file for writing;
      determining whether the first file is located in a volatile memory partition of the at least one memory;
      based on determining that the first file is not located in the volatile memory partition of the at least one memory;
         copying the first file from a normal memory partition of the at least one memory to the volatile memory partition, and
         opening the first file located in the volatile memory partition for writing;
      based on determining that the first file is located in the volatile memory partition;
         opening the first file located in the volatile memory partition for writing; and
         directing write commands from the application to the first file located in the volatile memory partition;
      receiving an open-read command from the application to open a second file for reading;
      determining whether the second file is located in the volatile memory partition of the at least one memory;
      based on determining that the second file is not located in the volatile memory partition of the at least one memory:
         opening the second file located in the normal memory partition for reading, and
         directing read commands from the application to the second file located in the normal memory partition; and
      based on determining that the second file is located in the volatile memory partition:
         opening the second file located in the volatile memory partition for reading; and
         directing read commands from the application to the second file located in the volatile memory partition.

2. The electronic terminal of claim 1, wherein responsive to the switching from the normal memory access mode to the volatile memory access mode, the operations further comprise, prior to the receiving of the open-write command from the application:

notifying at least one application that is running to save its operational state data to a file;

closing the at least one application; and starting one of the at least one application that was closed, wherein the one of the at least one application is the application from which the open-write command is received and the first file is the file in which the at least one application saved its operational state data responsive to the notifying.

3. The electronic terminal of claim 2, wherein the operations further comprise:

responsive to the switching from the normal memory access mode to the volatile memory access mode or responsive to the closing the at least one application, allocating the volatile memory partition in the at least one memory.

4. The electronic terminal of claim 3, wherein the operations further comprise:

generating a notification for a user of the electronic terminal in response to a remaining file storage capacity of the volatile memory partition which has been allocated, falling below a threshold level.

5. The electronic terminal of claim 1, wherein the operations further comprise, based on the determining that the first file is not located in the volatile memory partition of the at least one memory:

determining whether the first file is located in the normal memory partition of the at least one memory;

based on determining that the first file is not located in the normal memory partition of the at least one memory, opening a new file as the first file in the volatile memory partition for writing; and based on determining that the first file is located in the normal memory partition of the at least one memory, performing the copying of the first file from the normal memory partition to the volatile memory partition, and the opening of the first file located in the volatile memory partition for writing.

6. The electronic terminal of claim 1, wherein the operations further comprise:

returning a file open response to the application based on completion of the first file being opened in the volatile memory partition for writing, to indicate that write commands from the application are permitted.

7. The electronic terminal of claim 1, wherein the operations further comprise:

based on completing of the opening the second file located in the normal memory partition for reading or the opening the second file located in the volatile memory partition for reading, returning a file open response to the application.

8. The electronic terminal of claim 1, wherein the operations further comprise:

receiving a delete command from the application to delete a third file;

determining whether the third file is located in the volatile memory partition of the at least one memory;

based on determining that the third file is not located in the volatile memory partition of the at least one memory, renaming the third file located in the normal memory partition to prevent read and write access by the application; and based on determining that the third file is located in the volatile memory partition:

deleting the third file located in the volatile memory partition, and renaming the third file located in the normal memory partition to prevent read and write access by the application, based on determining that the third file is located in the normal memory partition of the at least one memory.

9. The electronic terminal of claim 1, wherein the operations further comprise:

switching from the volatile memory access mode back to the normal access mode responsive to receiving a user input;

closing the application that is running;

deleting the first file located in the volatile memory partition of the at least one memory;

determining whether a fourth file in the normal memory partition was renamed to prevent access by the application;

based on determining that a fourth file is located in the normal memory partition that was renamed to prevent access by the application, returning a name of the file back to an original name;

starting the application;

receiving an open-write command from the application to open a fifth file for writing;

opening the fifth file in the normal memory partition for writing; and directing write commands from the application to the fifth file located in the volatile memory partition.

10. The electronic terminal of claim 9, wherein the operations further comprise:

responsive to the switching from the volatile memory access mode back to the normal access mode or responsive to the closing the application that is running, deallocating the volatile memory partition in the at least one memory to allow at least partial inclusion of memory space within the normal memory partition.

11. The electronic terminal of claim 9, wherein the operations further comprise:

generating a reminder notification for a user of the electronic terminal responsive to determining that a threshold time has expired since the switching from the normal memory access mode to the volatile memory access mode without receiving a user input, to the switching from the volatile memory access mode back to the normal access mode, and wherein the reminder notification informs the user that the volatile memory access mode is still active.

12. The electronic terminal of claim 9, wherein the operations further comprise, based on the switching from the volatile memory access mode back to the normal access mode:

determining whether the user desires reversion to an operational state before the switching from the normal access memory mode to the volatile memory access mode;

based on determining that the user desires the reversion, performing the closing, the deleting, and determining whether a fifth file in the normal memory partition was renamed to prevent access by the application;

based on determining that the user does not desire the reversion, performing further operations, the further operations comprising:

copying the first file located in the volatile memory partition of the at least one memory to the normal memory partition; and based on determining that a seventh file is located in the normal memory partition that was renamed to prevent access by the application, deleting the seventh file from the normal memory partition.

13. A method performed by circuitry in an electronic terminal for managing file access by applications running on the electronic terminal, the method comprising:

switching an operation from a normal memory access mode to a volatile memory access mode responsive to receiving a user input;

receiving an open-write command from an application to open a first file for writing;

determining whether the first file is located in a volatile memory partition of at least one memory of the electronic terminal;

based on determining that the first file is not located in the volatile memory partition of the at least one memory:
copying the first file from a normal memory partition of the at least one memory to the volatile memory partition, and
opening the first file located in the volatile memory partition for writing;

based on determining that the first file is located in the volatile memory partition:
opening the first file located in the volatile memory partition for writing; and
directing write commands from the application to the first file located in the volatile memory partition;

receiving an open-read command from the application to open a second file for reading;

determining whether the second file is located in the volatile memory partition of the at least one memory;

based on determining that the second file is not located in the volatile memory partition of the at least one memory:
opening the second file located in the normal memory partition for reading, and
directing read commands from the application to the second file located in the normal memory partition; and based on determining that the second file is located in the volatile memory partition:
opening the second file located in the volatile memory partition for reading; and
directing read commands from the application to the second file located in the volatile memory partition.

14. The method of claim 13, wherein responsive to the switching from the normal memory access mode to the volatile memory access mode, the method further comprises, prior to the receiving of the open-write command from the application:
notifying at least one application that is running to save its operational state data to a file;
closing the at least one application; and
starting one of the at least one application that was closed, and wherein the one of the at least one application is the application from which the open-write command is received and the first file is the file in which the at least one application saved its operational state data responsive to the notifying.

15. The method of claim 14, further comprising:
responsive to the switching from the normal memory access mode to the volatile memory access mode or responsive to the closing the at least one application, allocating the volatile memory partition in the at least one memory.

16. The method of claim 13, further comprising, based on the determining that the first file is not located in the volatile memory partition of the at least one memory:
determining whether the first file is located in the normal memory partition of the at least one memory;
based on determining that the first file is not located in the normal memory partition of the at least one memory, opening a new file as the first file in the volatile memory partition for writing; and
based on determining that the first file is located in the normal memory partition of the at least one memory, performing the copying of the first file from the normal memory partition to the volatile memory partition and the opening of the first file located in the volatile memory partition for writing.

17. The method of claim 13, further comprising:
returning a file open response to the application based on completion of the first file being opened in the volatile memory partition for writing, to indicate that write commands from the application are permitted.

18. The method of claim 13, further comprising:
based on completing of the opening the second file located in the normal memory partition for reading or the opening the second file located in the volatile memory partition for reading, returning a file open response to the application.

* * * * *